United States Patent [19]

Shikata et al.

[11] Patent Number: 5,170,852
[45] Date of Patent: Dec. 15, 1992

[54] AUTOMATIC SCREW FASTENING MACHINE

[75] Inventors: Osamu Shikata; Hirotada Sugiura; Masatomo Adachi; Kazunori Isono, all of Kyoto, Japan

[73] Assignee: Nitto Seiko Co., Ltd., Kyoto, Japan

[21] Appl. No.: 881,145

[22] Filed: May 11, 1992

[51] Int. Cl.$^5$ ............................................. B25B 23/14
[52] U.S. Cl. ................................... 173/181; 173/182; 475/186; 475/193
[58] Field of Search ............... 173/176, 177, 179, 180, 173/181, 182, 183; 475/186, 193; 192/55

[56] References Cited

U.S. PATENT DOCUMENTS

| | | | |
|---|---|---|---|
| 3,613,853 | 10/1971 | Linthicum | 173/181 |
| 4,060,137 | 11/1977 | Bickford et al. | 173/180 |
| 4,232,561 | 11/1980 | Kashihara et al. | 475/193 |
| 4,487,270 | 12/1984 | Huber | 173/176 |
| 4,892,012 | 1/1990 | Kashihara | 475/186 |
| 4,968,290 | 11/1990 | Kashihara et al. | 475/193 |

Primary Examiner—Douglas D. Watts
Assistant Examiner—Scott A. Smith
Attorney, Agent, or Firm—Koda and Androlia

[57] ABSTRACT

An automatic screw fastening machine embodied by the invention transmits the rotating force of a motor to a driver bit via a differential planetary mechanism consisting of an input disc, a plurality of planetary cones, a cam disc, and a variable-speed ring. The automatic screw fastening machine causes a resilient supporting unit to restrict the variable-speed ring from shifting itself in the axial direction. Furthermore, the machine is provided with a torque detection unit capable of detecting the torque of reaction force applied to the variable-speed ring by effect of the load applied to the driver bit. As soon as the detect-signal value correctly matches a specific value corresponding to the predetermined fastening torque, supply of power to the motor is discontinued. In consequence, when fully completing a screw fastening process, rotation of the driver bit is substantially reduced to zero so that no rotating force can be transmitted to the driver bit. This in turn prevents the driver bit from adversely being affected by own inertia. This permits the driver bit to fully stop own movement simultaneous with the completion of the screw fastening process. The automatic screw fastening machine thus offers incomparable capability to execute every screw fastening process by securely applying the desired fastening torque.

2 Claims, 3 Drawing Sheets

AUTOMATIC SCREW FASTENING MACHINE

BACKGROUND OF THE INVENTION

1. Field of the Invention

The present invention relates to an automatic screw fastening machine which is capable of securely fastening screws or bolts by applying desired fastening torque without affecting them by inertia inherent in a driver bit at the moment of completing a process for fastening screws or bolts.

2. Prior Art

Conventionally, in order to properly control torque available for fastening screws or bolts, a driver bit is rotated by a rotation drive source such as a motor which can also detect load torque applied to the driver bit via a proper detection means, and then, as soon as the detected value correctly matches a predetermined value, operation of the rotation drive source is brought to a stop. Nevertheless, when executing this conventional method, in particular, when a low value is predetermined for the fastening torque, due to adverse effect of inertia inherent in the rotation drive source, actual fastening torque value exceeds the predetermined value at the moment at which completion of the screw fastening operation is detected. As a result, neither screws nor bolts can be fastened with correct fastening torque.

SUMMARY OF THE INVENTION

It is a primary object of the present invention to provide such a new and novel automatic screw fastening machine capable of correctly fastening screws or bolts even when applying low-level fastening torque previously set.

It is a further object of this invention to provide a new and novel automatic screw fastening machine with an unique differential planetary mechanism consisting of an input disc, a plurality of planetary cones, a cam disc and a variable-speed ring, and with a torque detection unit capable of detecting the torque of reaction force by effect of the load applied to the driverbit which is substantially free from being affected by the inertia of the drive source.

It is a still further object of the invention to provide additionally with a differential planetary gear mechanism being disposed between a cam disc of the differential planetary mechanism for increasing a output torque of the driverbit.

It is a furthermore object of the invention to provide with a new and novel automatic screw fastening machine with a torque detecting unit capable of detecting the torque of reaction by effect of the load applied to the driverbit without any loss of the torque arising in being transmitted to the driverbit.

In keeping with the principle of the present invention, the objects of this invention are accomplished by a novel automatic screw fastening machine which is characterized by the provision of those components described below.

A driver bit is connected to a rotation drive source via an input disc which is rotatable by the drive source, a planetary cones which are frictionally engaged with external circumferences of the input disc, and a cam disc which is frictional engaged with the planetary cone. A variable-speed ring is disposed in contact with the external circumference of the planetary cone by way of frictionally being engaged with the cone surface, where the variable-speed ring is held by a resilient supporting member, and yet, receives torque of reaction force by effect of load torque applied to the driver bit. Furthermore, a fastening-completion detecting unit is provided, which stops the rotation of the drive source at the moment when the signal output from the torque detection unit reaches a specific value corresponding to a predetermined fastening torque value. Whenever load torque applied to the driver bit rises, the automatic screw fastening machine embodied by the invention steplessly decreases the rotation of the driver bit so that the screw fastening operation can securely be executed by applying the desired torque value.

Additionally, a differential planetary gear mechanism can be disposed between the cam disc and the driver bit. The differential planetary gear mechanism incorporates a ring-gear unit which is rotated by reaction force applied to the driver bit. A torque detection unit is secured to the ring-gear unit.

By means of the unique automatic screw fastening machine, rotating force of the drive source is transmitted to a driver bit via a differential planetary mechanism at a specific reduction ratio which is dependent on the frictional engaged position between a planetary cone and a variable-speed ring so that a designated screw can be fastened to a workpiece. As soon as the screw is fastened to the workpiece, in correspondence with load applied to the driver bit, reaction torque is applied to the variable-speed ring via the differential planetary gear mechanism. Relative to the growth of reaction force torque applied to the driver bit, the variable-speed ring held by a resilient supporting unit rotates to shift itself in the axial direction. As a result, the reduction ratio rises to gradually and steplessly decrease the number of the rotation of the driver bit.

In the meanwhile, in correspondence with load applied to the driver bit, the ring-gear unit of the differential planetary gear mechanism also receives reaction force to rotate itself in the direction opposite from the driver bit. A torque detection unit provided for the control system detects torque of reaction force applied to the ring-gear unit.

A designated screw is then fastened in the above condition, and then, as soon as the signal output from the torque detection unit reaches a specific value corresponding to a predetermined fastening torque value, a fastening completion detecting unit delivers a stop signal to the rotation drive source. On receipt of the stop signal, the rotation drive source stops its own rotation, thus completing a screw-fastening operation. Simultaneous with full stop of the rotation of the drive source, the driver bit under rotation at a low speed instantaneously stops the own rotation without being affected by inertia, thus permitting the screw fastening machine to fasten the designated screw exactly at the desired fastening torque value.

For a consideration of what I believe to be novel and inventive, attention is directed to the following disclosure while the invention itself is pointed out with greater particularity in appended claims.

BRIEF DESCRIPTION OF THE DRAWINGS

The above features and objects of the present invention will become more apparent with reference to the following description taken in conjunction with the accompanying drawings wherein like reference numerals denote like elements and which.

DETAILED DESCRIPTION OF THE INVENTION

Referring now to the accompanying drawings, detail of the automatic screw fastening machine embodied by the invention is described below.

Figure 1:
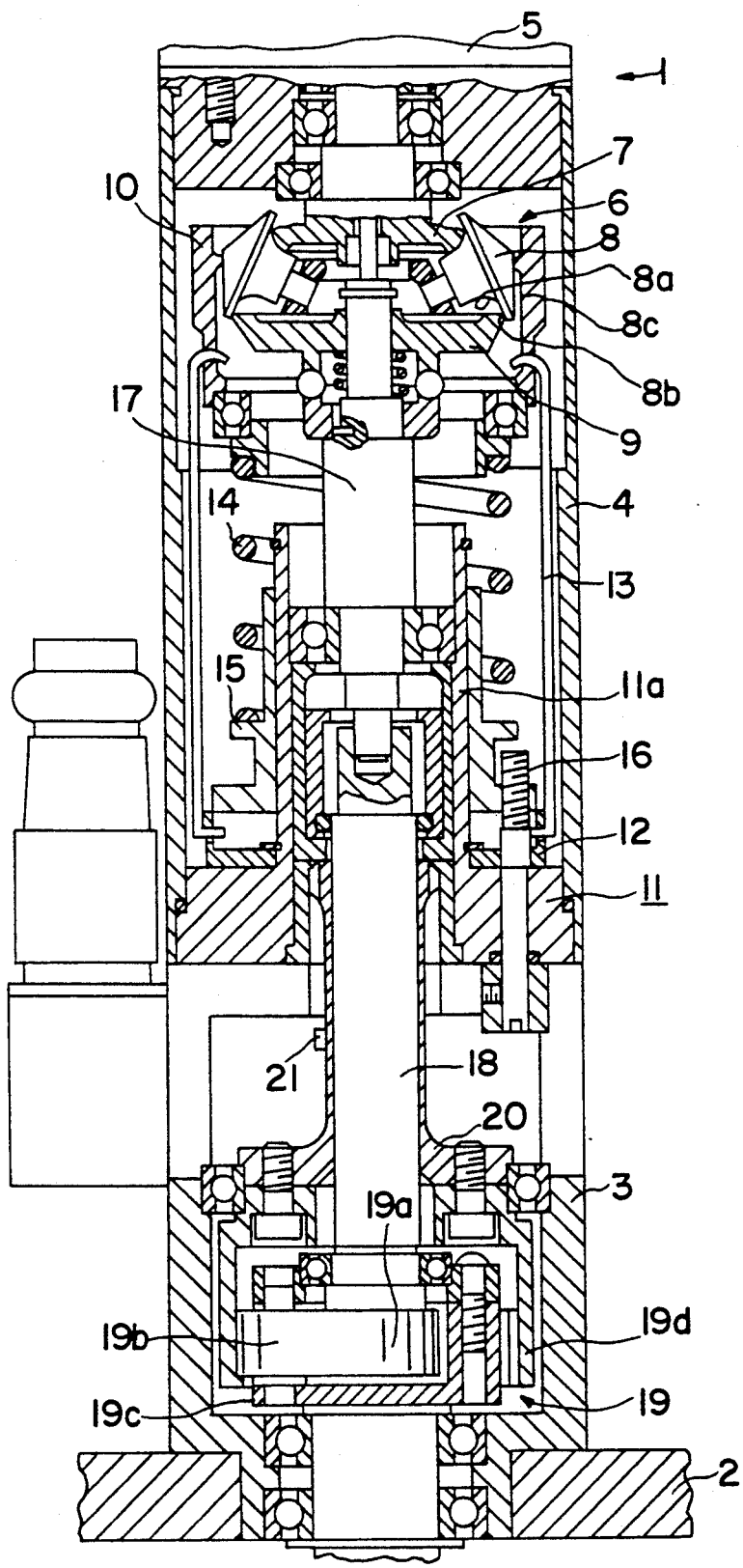
FIG. 1 is an enlarged cross-sectional view of the fundamental components of the automatic screw fastening machine according to an embodiment of the invention.
Figure 2:
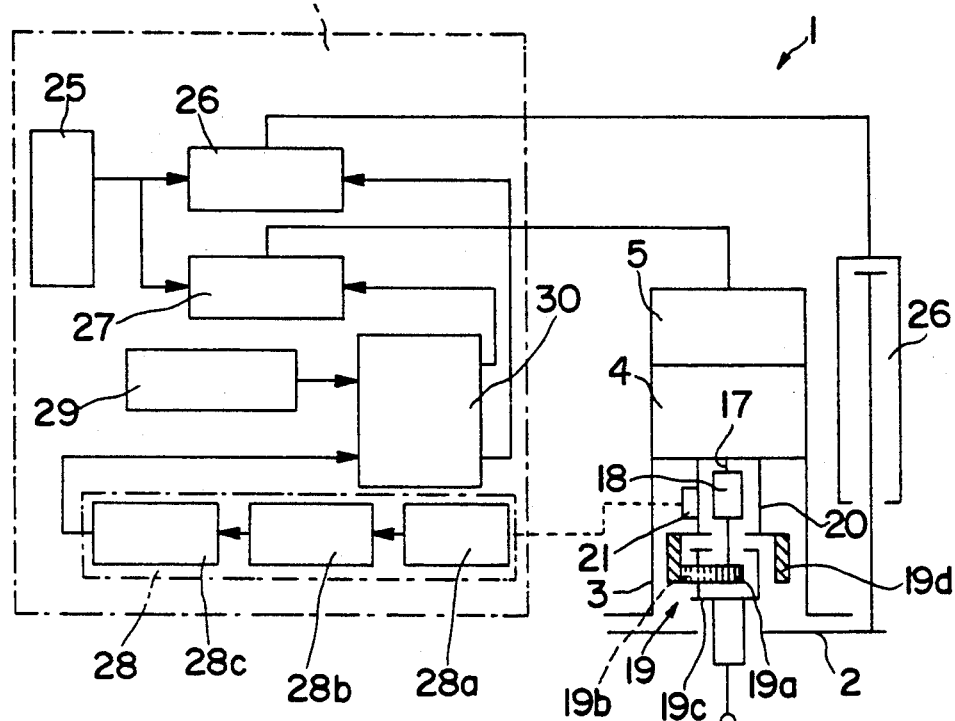
FIG. 2 schematically illustrates an overall block diagram of the automatic screw fastening machine embodied by the invention.

The reference numeral 1 shown in FIGS. 1 and 2 designates the automatic screw fastening machine according to an embodiment of the invention. The automatic screw fastening machine 1 is furnished with a driver casing 4 which is secured to a driver base plate 2 via a gear casing 3, where the driver base plate 2 is driven in the vertical direction by an up-and-down drive source 26 such as an air cylinder. The driver casing 4 is filled with lubricating oil in order that a differential planetary mechanism 6 to be described hereafter is immersed and kept lubricated in it. A motor 5 of a rotation drive source is secured to an end of the driver casing 4. An input disc 7 making up part of the differential planetary mechanism 6 is connected to the drive shaft of the motor 5 so that the input disc 7 can integrally be rotated by the drive shaft of the motor 5. A plurality of planetary cones 8 are disposed around the external circumference of the input disc 7, where a circumferential groove 8a of each planetary cone 8 is frictional engaged with the input disc 7 in order that each planetary cone 8 can properly be rotated. A cam disc 9 is disposed on a plane surface 8b on the back of the cone surface 8c of the planetary cone 8, where the cam disc 9 is coaxially rotated in conjunction with the input disc 7 by way of frictionally being engaged with the back plane surface 8b. A variable-speed ring 10 is disposed around the external circumference of the planetary cone 8 so that the ring 20 can properly be rotated by way of frictionally being engaged with the cone surface 8c of the planetary cone 8. At a near end of the variable-speed ring 10, one each end of three arms 13 is hooked and other each end is also hooked by a stationary ring 12 fixed on the part of a bottom sealing lid 11 so that the ring 10 can rotatably be held around the cone surfaces 8c. And yet, the variable-speed ring 10 is energized upwardly by a spring 14 so that the frictional engagement with the cone surface 8c can be held on the high-speed position, that is a top of the cone. The resilient supporting member is composed of the spring 14 and the arm 13. The resilient supporting unit rules the frictionally engagable position of the variable-speed ring 10 and determines the maximum value of reduction ratio and the maximum value of fastening torque as well. The spring 14 is mounted on a spring washer 15 which is transferable along the cylindrical part 11a of the bottom sealing lid 11. The spring washer 15 is helically coupled with an adjustment bolt 16 which is rotatably held at the same position by the bottom sealing lid 11, and yet, the position of the spring washer 15 can optionally be selected.

A connecting shaft 18 is connected to the cam disc 9 via an output shaft 17 which is rotatably held by the cylindrical part 11a of the bottom sealing lid 11 making up part of the driver casing 4, thus permitting the cam disc 9, the output shaft 17, and the connecting shaft 18, to integrally rotate themselves. To the bottom end of the connecting shaft 18, A sun gear 19a of a differential planetary gear mechanism 19 stored in the gear casing 3 is connected. Three planetary gears 19b of the differential planetary gear mechanism 19 respectively being engaged with the sun gear 19a at equal intervals are disposed in the state being supported by a planetary gear base 19c. These planetary gears 19c are respectively engaged with inner gears of a ring gear unit 19d, where the inner gears are rotatably held inside of the gear case 3. This structure permits the rotation of the connecting shaft 18 to be reduced to a predetermined ratio on being transmitted to the planetary-gear base 19c. A strain tube 20 (which is an example of torque detection unit) is secured to the ring-gear unit 19d by way of enveloping the connecting shaft 18. The top end of the strain tube 20 is secured to the cylindrical part 11a of the bottom sealing lid 11. A strain gauge 21 is secured to the strain tube 20 in order to detect the strained amount arising in itself. After detecting the strained amount of the strain tube 20, the strain gauge 20 detects torque of reaction force applied to the ring-gear unit 19d.

A drive bit 23 is connected to the planetary gear base 19c via a transmission mechanism 22 so that the rotation of the motor 5 can be transmitted to the drive bit 23.

The automatic screw fastening machine embodied by the invention is furnished with a control system 24 which comprises the following; an operation activating unit 25 which outputs "Operation activating" signal, an up-and-down drive source 26 which activates operation on receipt of the operation activating signal, a power-supply unit 27 which feeds power to the motor 5 on receipt of the operation-activating signal a torque detection unit 28 which, on receipt of the operation activating signal, detects torque of reaction force applied to the driver bit 23, and a fastening completion detecting unit 30 which outputs a stop signal to discontinue the supply of power to the motor 5 as soon as the signal output from the torque detection unit 28 reaches a specific value corresponding to the fastening torque predetermined by a torque setting unit 29, and yet, restores operation of the up-and-down drive source 26.

The torque detection unit 28 is composed of a filtering circuit 28a, a zero-point compensation circuit 28b, and a calibration circuit 28c. The torque detection unit 28 generates a detected value corresponding to the fastening torque value after executing a calibration process. The detected torque value is analog mode. However, the detected analog torque value may optionally be converted into digitalized value as required. If the control system 24 were provided with a switchover unit (not shown) capable of reversing the motor 5, then, even when the differential planetary mechanism 6 runs into stalled condition, the control system 24 can securely release this condition.

Next, functional operation of the automatic screw fastening machine embodied by the invention is described below.

Initially, when the power-supply unit 27 receives the operation activating signal from the operation activating unit 25, it starts to feed power to the motor 5 so that the motor 5 can start up rotation. Then, relative to the rotation of the motor 5, rotating force is transmitted to the driver bit 23 via the differential planetary mechanism 6 consisting of the input disc 7, the planetary cones 8, the cam disc 9, and the variable-speed ring 10. Rotation force is also transmitted to the drive bit 23 via the differential planetary gear mechanism 19. As a result, a workable screw disposed at the tip of the driver bit 23 is coupled with the bottom hole of a predetermined workpiece, and then, a fastening operation is initiated. After helically inserting the screw into the bottom hole of a predetermined workpiece (not shown), load applied to the driver bit 23 increases. Then, torque of reaction force corresponding to the load is transmitted to the ring-gear unit 19d of the differential planetary gear mechanism 19 to permit the ring-gear unit 19 to rotate itself in the direction opposite from the direction of the rotation of the driver bit 23. Simultaneously, load applied to the sun gear 19a also increases. As a result, a certain amount of the torque of reaction force is generated in correspondence with the load actually applied to the driver bit 23 in the output shaft 17 and the connecting shaft 18 which are respectively integrated with the cam disc 9 of the differential planetary mechanism 6. Torque of reaction force rotates the variable-speed ring 10. On the other hand, since the variable-speed ring 10 is held by the arm 13 having a predetermined length, owing to the effect of own rotation, the variable-speed ring 10 shifts itself in the axial direction. On the way of executing shift, the amount of shifting movement allowed for the variable-speed ring 10 is restricted by the spring 14. As a result, the variable-speed ring 10 moves itself up to the position a which the depressing force against the spring 14 is generated in the variable-speed ring 10 by effect of the torque of reaction force and the resilient force generated by the flexure of the spring 14 are equilibrated.

Figure 3:
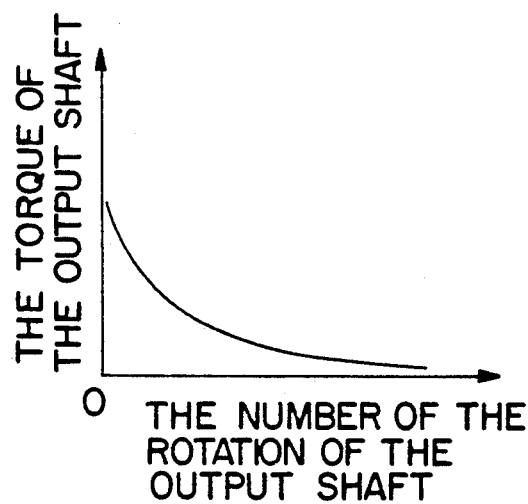
FIG. 3 is a graphical chart designating the characteristic diagram between the torque of the output shaft of the deferential planetary mechanism and the number of the rotation of the output shaft of the automatic screw fastening machine embodied by the invention.

When the load applied to the driver bit 23 further increases to a level close to the value of the desired fastening torque, and in addition, when the load applied to the output shaft 17 and the link shaft 18 adjacent to each other across the differential planetary gear mechanism 19 also grows for example, the variable-speed ring 10 shifts itself to the vicinity of the edge of the planetary code 8. This in turn causes both the output shaft 17 and the link shaft 18 to respectively decelerate their rotation to a level substantially being close to zero, and as a result, rotation of the driver bit 23 is also decelerated to a level substantially close to zero as well. This permits the driver bit 23 to properly fasten the designated screw while generating specific fastening torque as per the characteristic curve shown in FIG. 3.

In the meanwhile, relative to the incremental load applied to the driver bit 23, the ring-gear unit 19d receives the torque of reaction force so that it can rotate itself furthermore. The strain gauge 21 detect the strained amount of the strain tube 20 caused by the rotation of the ring-gear unit 19d. The detect signal output from the strain gauge 21 is then amplified. As soon as the value of the detect signal correctly matches a specific value corresponding to the fastening torque previously registered in the torque setting unit 28, the fastening completion detecting unit 30 outputs a fastening-completion acknowledging signal to stop the power-supply unit 27 to feed power to the motor 5. When this condition is entered the drive bit 23 is substantially at a full stop, and therefore, inertia inherent in the driver bit 23 cannot substantially be generated. When the power is shut off from the motor 5, inertia proper the motor 5 is transmitted to the input disc 7 of the differential planetary mechanism 6 to rotate the input disc 7. Nevertheless, rotation of the cam disc 7 cannot virtually be transmitted to the output shaft 17 nor to the link shaft 18 owing to the functional operation of the differential planetary mechanism 6. In consequence, simultaneous with the discontinued supply of power to the motor 5, the driver bit 23 can fully stop own rotation without being affected by own inertia at all, thus making it possible for the driver bit 23 to securely fasten the designated screw by correctly applying the predetermined fastening torque.

Figure 4:
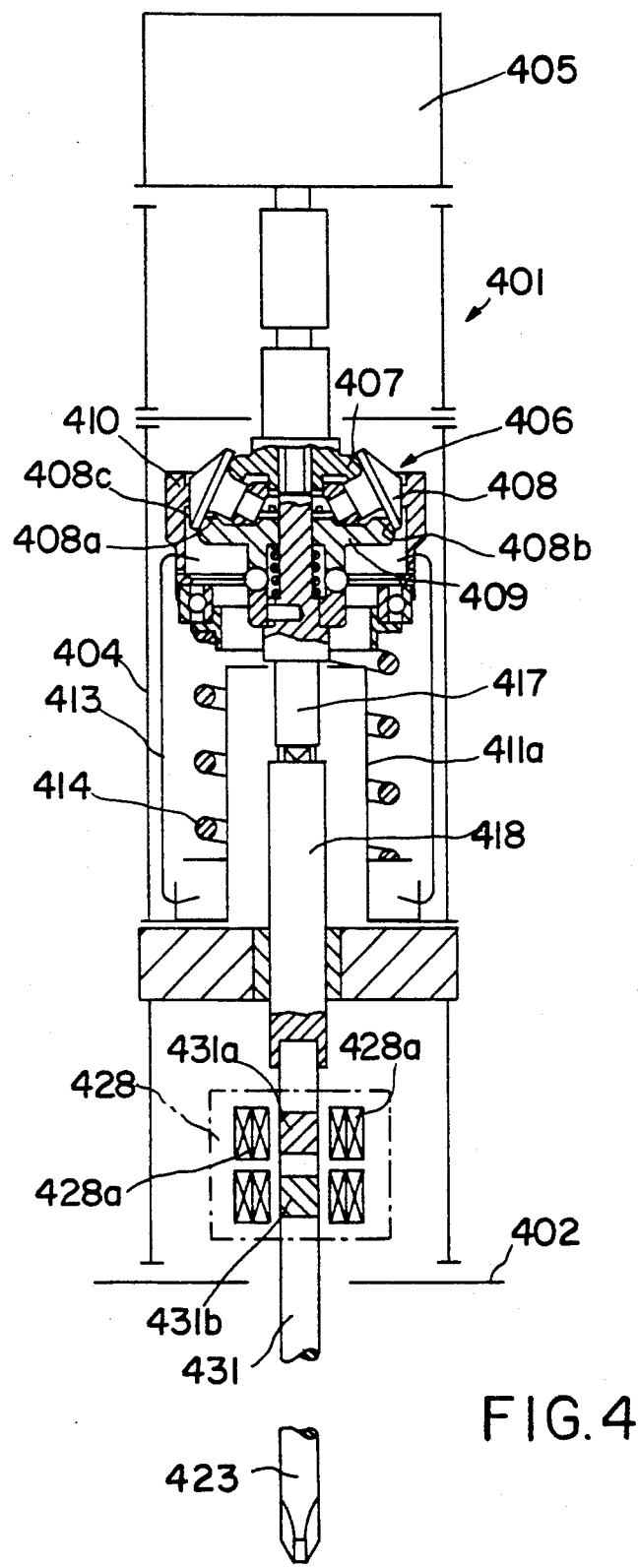
FIG. 4 illustrates a partially cross sectional and symbolic view of the automatic screw fastening machine according to other embodiment of the invention.

Referring to FIG. 4, other embodiment of the invention is shown that an automatic screw fastening machine 401 is provided with an unique torque detection unit 428 which can detect the torque of reaction force relative to the incremental load applied to the driver bit 423 without the torque detection unit consisting of a differential planetary gear mechanism and a strain tube with strain gages. The unique torque detection unit 428 is incorporated in a torque detection shaft 431 connected between a link shaft 418 and a driver bit 423 and magnetic strain sensing coil 428a. The torque detection shaft 431 is provided with short bands of magnetic material 421a slightly declined in one direction and attached in a zebra pattern at its upper peripheral. It is also provided with short bands of magnetic material 431b slightly declined in reverse direction and attached in a zebra pattern at its lower peripheral. And the magnetic strain sensing coil 428a can detect magnetic strain inherent in the detecting shaft as a current because of the deformation of the bands of the magnetic material.

What is claimed is:

1. A driver bit which is connected to a rotation drive source via an input disc rotated by said drive source, a planetary cone frictionally engaged with the external circumference of said input disc, and a cam disc frictionally engaged with said planetary cone;
   a variable-speed ring which is frictionally engaged with said external circumference of said planetary cone;
   a resilient supporting member which receives reaction force applied to said variable-speed ring by effect of load torque applied to said driver bit;
   a differential planetary gear mechanism which is disposed between said cam disc and said driver bit in order to cause reaction force applied to said driver bit to rotatably hold a ring-gear unit incorporating inner gears;
   a torque detection unit which is secured to said ring-gear unit; and
   a fastening completion detecting unit which outputs a fastening-completion signal simultaneous with arrival of signal output from said torque detection unit at a specific value corresponding to a predetermined fastening torque value.

2. In the automatic screw fastening machine in claim 1, a torque detecting unit is disposed between a cam disk and a driver bit by way of a differential planetary gear mechanism.

* * * * *